US010940868B2

(12) United States Patent
Asakura et al.

(10) Patent No.: US 10,940,868 B2
(45) Date of Patent: Mar. 9, 2021

(54) VEHICLE CONTROL DEVICE, VEHICLE CONTROL METHOD, AND VEHICLE CONTROL PROGRAM

(71) Applicant: HONDA MOTOR CO., LTD., Tokyo (JP)

(72) Inventors: Masahiko Asakura, Tokyo (JP); Hironobu Kiryu, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 329 days.

(21) Appl. No.: 15/742,122

(22) PCT Filed: Jun. 24, 2016

(86) PCT No.: PCT/JP2016/068805
§ 371 (c)(1),
(2) Date: Jan. 5, 2018

(87) PCT Pub. No.: WO2017/010264
PCT Pub. Date: Jan. 19, 2017

(65) Prior Publication Data
US 2018/0194364 A1 Jul. 12, 2018

(30) Foreign Application Priority Data
Jul. 10, 2015 (JP) .................................. 2015-138717

(51) Int. Cl.
*B60W 30/10* (2006.01)
*B60W 50/029* (2012.01)
(Continued)

(52) U.S. Cl.
CPC .......... *B60W 50/029* (2013.01); *B60W 30/12* (2013.01); *B60W 30/182* (2013.01);
(Continued)

(58) Field of Classification Search
USPC ...................................................... 701/23–28
See application file for complete search history.

(56) References Cited

U.S. PATENT DOCUMENTS 8,676,431 B1 * 3/2014 Mariet ................. G05D 1/0246
701/28
9,221,396 B1 * 12/2015 Zhu ........................... G01S 7/40
(Continued)

FOREIGN PATENT DOCUMENTS

| CN | 101842820 | 9/2010 |
| JP | 10-076964 | 3/1998 |

(Continued)

OTHER PUBLICATIONS

International Search Report for International Patent Application No. PCT/JP2016/068805 dated on Sep. 20, 2016, 5 pages.
(Continued)

*Primary Examiner* — Jonathan L Sample
(74) *Attorney, Agent, or Firm* — Amin, Turocy & Watson, LLP

(57) ABSTRACT

A vehicle control device includes a travel control unit configured to control travel of a vehicle on the basis of an action plan including a plurality of events that are sequentially executed to control acceleration and deceleration or steering when the vehicle travels; an abnormality detection unit configured to detect a specific abnormal state that affects a control result of the travel control unit based on the action plan; and a changing unit configured to change content controlled by the travel control unit on the basis of either or both of a type of an event being executed according to control by the travel control unit and a type of an event scheduled to be executed following the event being executed among events included in the action plan when the specific abnormal state is detected by the abnormality detection unit.

13 Claims, 9 Drawing Sheets

(51) Int. Cl.
  *B60W 30/12* (2020.01)
  *B60W 30/182* (2020.01)
  *B60W 50/02* (2012.01)
  *G08G 1/0962* (2006.01)
  *B62D 15/02* (2006.01)
  *B60W 30/18* (2012.01)
  *G05D 1/00* (2006.01)

(52) U.S. Cl.
  CPC ...... *B60W 30/18163* (2013.01); *B60W 50/02* (2013.01); *B62D 15/025* (2013.01); *G05D 1/0061* (2013.01); *G05D 1/0088* (2013.01); *G08G 1/0962* (2013.01); *B60W 2555/00* (2020.02); *B60W 2710/20* (2013.01); *B60W 2720/106* (2013.01)

(56) References Cited

U.S. PATENT DOCUMENTS

| | | | | |
|---|---|---|---|---|
| 9,355,562 | B1* | 5/2016 | Ferguson | G08G 1/20 |
| 9,428,194 | B2* | 8/2016 | Prokhorov | B60W 40/064 |
| 10,223,479 | B1* | 3/2019 | Konrardy | G07C 5/008 |
| 2010/0002081 | A1* | 1/2010 | Pawlicki | B60W 50/14 |
| | | | | 348/148 |
| 2010/0042282 | A1* | 2/2010 | Taguchi | B60W 30/12 |
| | | | | 701/25 |
| 2010/0063663 | A1* | 3/2010 | Tolstedt | G05D 1/0231 |
| | | | | 701/23 |
| 2011/0254675 | A1* | 10/2011 | Koehler | B60K 28/066 |
| | | | | 340/439 |
| 2013/0325241 | A1* | 12/2013 | Lombrozo | B60W 30/16 |
| | | | | 701/23 |
| 2014/0156133 | A1* | 6/2014 | Cullinane | B60R 16/023 |
| | | | | 701/23 |
| 2014/0244096 | A1* | 8/2014 | An | G05D 1/0055 |
| | | | | 701/25 |
| 2014/0309870 | A1* | 10/2014 | Ricci | B60C 1/00 |
| | | | | 701/36 |
| 2014/0350789 | A1* | 11/2014 | Anker | B60W 50/087 |
| | | | | 701/41 |
| 2018/0072315 | A1* | 3/2018 | Enthaler | B60W 30/10 |
| 2019/0344790 | A1* | 11/2019 | Kitagawa | G05D 1/0061 |

FOREIGN PATENT DOCUMENTS

| | | |
|---|---|---|
| JP | 10-309961 | 11/1998 |
| JP | 2005-165915 | 6/2005 |
| JP | 2006-113815 | 4/2006 |
| JP | 2008-129804 | 6/2008 |
| JP | 2009-274594 | 11/2009 |
| JP | 2012-160128 | 8/2012 |

OTHER PUBLICATIONS

Chinese Office Action for Chinese Patent Application No. 201680039724.4 dated Aug. 1, 2019.

* cited by examiner

FIG. 5

| PATH INFORMATION | ACTION PLAN NAME | CONTROL SECTION K | CONTROL SECTION L | | | | | | | ... |
|---|---|---|---|---|---|---|---|---|---|---|
| | | MANUAL DRIVING MODE | AUTOMATIC DRIVING MODE | | | | | | | ... |
| PATH A | ACTION PLAN A | NO EVENT | LANE KEEP | ... | ... | LANE CHANGE | BRANCH | ... | ... | MERGE | ... | ... |

| | LANE KEEP | LANE CHANGE | MERGE | BRANCH | ... |
|---|---|---|---|---|---|
| RADAR 30-1 | EITHER IS NECESSARY | EITHER IS NECESSARY | NECESSARY | EITHER IS NECESSARY | ... |
| FINDER 20-1 | | | | | ... |
| CAMERA 40 | NECESSARY | | | | ... |
| RADARS 30-2 AND 30-3 | UNNECESSARY | NECESSARY | | NECESSARY | ... |
| MAP INFORMATION 132 | | | | | ... |
| ... | ... | ... | ... | ... | ... |

VEHICLE CONTROL DEVICE, VEHICLE CONTROL METHOD, AND VEHICLE CONTROL PROGRAM

TECHNICAL FIELD

The present invention relates to a vehicle control device, a vehicle control method, and a vehicle control program.

Priority is claimed on Japanese Patent Application No. 2015-138717, filed Jul. 10, 2015, the content of which is incorporated herein by reference.

BACKGROUND ART

In recent years, a technology in which, in an automatic driving vehicle configured to perform automatic steering so that a steering angle decided by a steering angle decision unit configured to decide a steering angle based on a travel direction determination unit is reached, when an abnormality of the travel direction determination unit is detected while automatic driving is executed, it is determined whether automatic driving is cancelled, and when it is determined that automatic driving cancellation is not possible, automatic driving continues while automatic steering is regulated by a unit configured to hold a steering device instead of the steering angle decision unit until it is determined that automatic driving cancellation is possible has been introduced (for example, refer to Patent Literature 1).

In addition, in relation to the above technology, a technology in which, in a route generation device configured to generate a target route of a host vehicle for a set prediction time on the basis of a predicted route of another vehicle, a degree of collision risk with the host vehicle is calculated based on a current route of the other vehicle, and when the degree of collision risk is equal to or greater than a set threshold value, the target route of the host vehicle is recalculated has been introduced (for example, refer to Patent Literature 2).

CITATION LIST

Patent Literature

[Patent Literature 1]
Japanese Unexamined Patent Application. First Publication No. H10-76964
[Patent Literature 2]
Japanese Unexamined Patent Application, First Publication No. 2012-160128

SUMMARY OF INVENTION

Technical Problem

However, in the technologies of the related art, when an abnormality occurs in a sensor and the like during automatic driving, it is not possible to accurately control a vehicle due to the abnormality, and an unexpected change may occur in the movement of the vehicle. In addition, when too many sensors are provided redundantly in order to avoid this situation, the cost and weight may increase.

In view of the above circumstances, according to aspects of the present invention, a vehicle control device, a vehicle control method, and a vehicle control program are provided through which it is possible to realize transition of a control state according to a state of a vehicle.

Solution to Problem (1) A vehicle control device according to an aspect of the present invention includes a travel control unit configured to control travel of a vehicle on the basis of an action plan including a plurality of events that are sequentially executed to control acceleration and deceleration or steering when the vehicle travels; an abnormality detection unit configured to detect a specific abnormal state that affects a control result of the travel control unit based on the action plan; and a changing unit configured to change content controlled by the travel control unit on the basis of either or both of a type of an event being executed according to control by the travel control unit and a type of an event scheduled to be executed following the event being executed among events included in the action plan when the specific abnormal state is detected by the abnormality detection unit.

(2) The aspect (1) further includes an action plan generating unit configured to generate the action plan on the basis of path information indicating a path to a destination set by a user, and the travel control unit may control travel of the vehicle on the basis of the action plan generated by the action plan generating unit.

(3) In the aspect (1) or (2), the changing unit may prohibit control based on the action plan by the travel control unit on the basis of either or both of a type of an event being executed according to control by the travel control unit and a type of an event scheduled to be executed following the event being executed among events included in the action plan when the specific abnormal state is detected by the abnormality detection unit.

(4) In any one of the aspects (1) to (3), when the specific abnormal state is detected by the abnormality detection unit, if the event being executed according to control by the travel control unit is a lane keep event in which the vehicle travels without deviating from a travel lane, the changing unit may cause the travel control unit to continue the lane keep event and prohibit transition to an event scheduled to be executed following the lane keep event.

(5) Any one of the aspects (1) to (4) further includes a control switching unit configured to perform a process of switching from an automatic driving mode in which travel control is performed by the travel control unit to a manual driving mode in which travel control is performed by an operation of a driver, and when the specific abnormal state is detected by the abnormality detection unit, the changing unit may cause the travel control unit to execute control for starting a process of switching from the automatic driving mode to the manual driving mode in the control switching unit so that the switching process is completed within a predetermined control transition period.

(6) In the aspect (5), the predetermined control transition period may be a period from when the control switching unit starts a process of switching the mode to the manual driving mode until a predetermined time elapses.

(7) In the aspect (5) or (6), the abnormality detection unit may detect the specific abnormal state on the basis of a detection result for each of a plurality of devices configured to detect an object near the vehicle.

(8) In any one of the aspects (5) to (7), the changing unit may determine whether the event scheduled to be executed following the event being executed by the travel control unit is capable of executing within the predetermined control transition period on the basis of the detection result of the abnormality detection unit, and when it is determined that the event scheduled to be executed following the event being executed by the travel control unit is capable of executing within the predetermined control transition period, may stop a process of changing content controlled by the travel control unit and allow transition to the scheduled event by the travel control unit.

(9) In the aspect (8), the changing unit may determine whether the travel control unit is capable of executing the lane keep event when it is determined that the event scheduled to be executed following the event being executed by the travel control unit is not capable of executing within the predetermined control transition period, and cause the travel control unit to execute control for stopping the vehicle within the predetermined control transition period when it is determined that the travel control unit is not capable of executing the lane keep event within the predetermined control transition period.

(10) The aspect (8) or (9) further includes a determination unit configured to, when the abnormality detection unit detects that the specific abnormal state is an abnormality related to the device, determine whether it is possible to cover a detection range of the device having an abnormality by a detection range of a device different from the device having an abnormality, and the changing unit may cause the travel control unit to execute control for stopping the vehicle within the predetermined control transition period when the determination unit determines that it is not possible to cover a detection range of the device having an abnormality by a detection range of a device different from the device having an abnormality.

(11) A vehicle control method according to an aspect of the present invention includes controlling travel of a vehicle on the basis of an action plan including a plurality of events that are sequentially executed to control acceleration and deceleration or steering when the vehicle travels; detecting a specific abnormal state that affects a control result of travel of the vehicle based on the action plan; and changing travel control content of the vehicle on the basis of either or both of a type of an event being executed according to control of travel of the vehicle and a type of an event scheduled to be executed following the event being executed among events included in the action plan when the specific abnormal state is detected.

(12) A vehicle control program according to an aspect of the present invention causes a computer to execute: controlling travel of a vehicle on the basis of an action plan including a plurality of events that are sequentially executed to control acceleration and deceleration or steering when the vehicle travels; detecting a specific abnormal state that affects a control result of travel of the vehicle based on the action plan; and changing travel control content of the vehicle on the basis of either or both of a type of an event being executed according to control of travel of the vehicle and a type of an event scheduled to be executed following the event being executed among events included in the action plan when the specific abnormal state is detected.

Advantageous Effects of Invention

According to the aspects (1), (2), (11), and (12), when the specific abnormal state is detected by the abnormality detection unit, since content controlled by the travel control unit is changed on the basis of either or both of a type of an event being executed according to control by the travel control unit and a type of an event scheduled to be executed following the event being executed among events included in the action plan, it is possible to realize control state transition according to the state of the vehicle In the aspect (3), when the specific abnormal state is detected by the abnormality detection unit, since control based on the action plan by the travel control unit is prohibited on the basis of either or both of a type of an event being executed according to control by the travel control unit and a type of an event scheduled to be executed following the event being executed among events included in the action plan, it is possible to maintain the vehicle in a more stable state.

In the aspect (4), when the specific abnormal state is detected by the abnormality detection unit, if the event being executed according to control by the travel control unit is a lane keep event in which the vehicle travels without deviating from a travel lane, since the travel control unit continues the lane keep event and transition to an event scheduled to be executed following the lane keep event is prohibited, it is possible to maintain the vehicle in a more stable state.

In the aspect (5) or (6), when the specific abnormal state is detected by the abnormality detection unit, since the travel control unit executes control for starting a process of switching from the automatic driving mode to the manual driving mode in the control switching unit so that the switching process is completed within a predetermined control transition period, it is possible to smoothly hand over the control right of the vehicle to the driver.

In any one of the aspects (8) to (10), it is determined whether the event scheduled to be executed following the event being executed by the travel control unit is capable of executing within the predetermined control transition period on the basis of the detection result of the abnormality detection unit, and when it is determined that the event scheduled to be executed following the event being executed by the travel control unit is capable of executing within the predetermined control transition period, a process of changing content controlled by the travel control unit is stopped and transition to the scheduled event by the travel control unit is allowed. Therefore, it is possible to perform control on the basis of the result obtained by appropriately determining a continuation possibility of control based on the action plan by the travel control unit.

BRIEF DESCRIPTION OF DRAWINGS

FIG. 5 is a diagram showing an example of an action plan generated by an action plan generating unit.

FIG. 6 is a diagram showing an example of table data used for determining a specific abnormal state.

DESCRIPTION OF EMBODIMENTS

Figure 1:
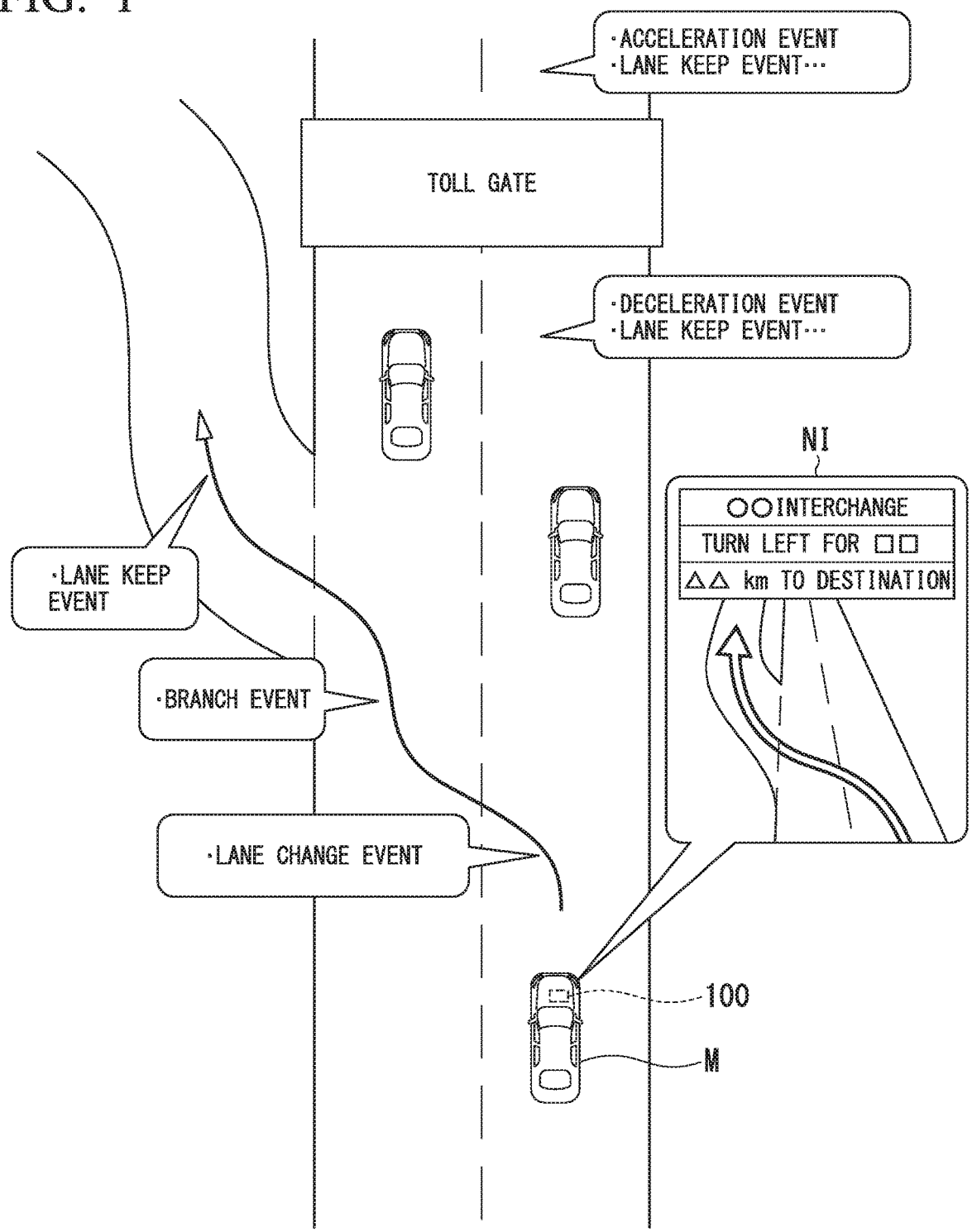
FIG. 1 is a diagram schematically showing operations of a vehicle (host vehicle) in which a vehicle control device according to the present embodiment is mounted.

A vehicle control device, a vehicle control method, and a vehicle control program according to embodiments of the present invention will be described below with reference to the drawings. FIG. 1 is a diagram schematically showing operations of a vehicle M (host vehicle) in which a vehicle control device 100 according to the present embodiment is mounted. In the present embodiment, the vehicle control device 100 can travel in an automatic driving mode in which a vehicle travels while a driver does not perform an operation (or while an operation amount is smaller or an operation frequency is lower than that in a manual driving mode in which the driver drives through manual operation). The vehicle M is, for example, a two-wheel, three-wheel, or four-wheel automobile, and may be an automobile using an internal combustion engine such as a diesel engine or a gasoline engine as a power source, an electric vehicle using an electric motor as a power source, a hybrid vehicle including an internal combustion engine and an electric motor in combination, and the like. In addition, the above-described electric vehicle may be an automobile that is driven using power discharged from various batteries, for example, a secondary battery, a hydrogen fuel cell, a metal fuel cell, and an alcohol fuel cell.

The example in FIG. 1 shows a state in which the vehicle control device 100 controls the travelling of the vehicle M so that the vehicle M automatically travels on a toll road such as a highway. On the basis of path information 134 indicating a path to a destination generated by a navigation device 50 to be described below, the vehicle control device 100 generates an action plan referred to when automatic driving along the path is performed. Here, FIG. 1 shows a state in which a navigation screen NI generated on the basis of the path information 134 is displayed. The navigation screen NI may be displayed only in the manual driving mode, and may be displayed in the manual driving mode and the automatic driving mode.

The action plan includes, for example, a deceleration event in which the vehicle M decelerates, an acceleration event in which the vehicle M accelerates, a lane keep event in which the vehicle M travels without deviating from a travel lane, a lane change event in which a travel lane is changed, an overtaking event in which the vehicle M overtakes a vehicle in front of it, a branch event in which a desired lane is changed at a branch point and the vehicle M travels without deviating from the changed lane, a merging event in which the vehicle M accelerates and decelerates at a lane junction point and changes a travel lane, and the like. In the example in FIG. 1, the vehicle control device 100 generates an action plan in which a lane change event, a branch event, and a lane keep event are consecutively executed in that order according to the path information 134 generated by the navigation device 50 and causes the vehicle M to travel.

Figure 2:
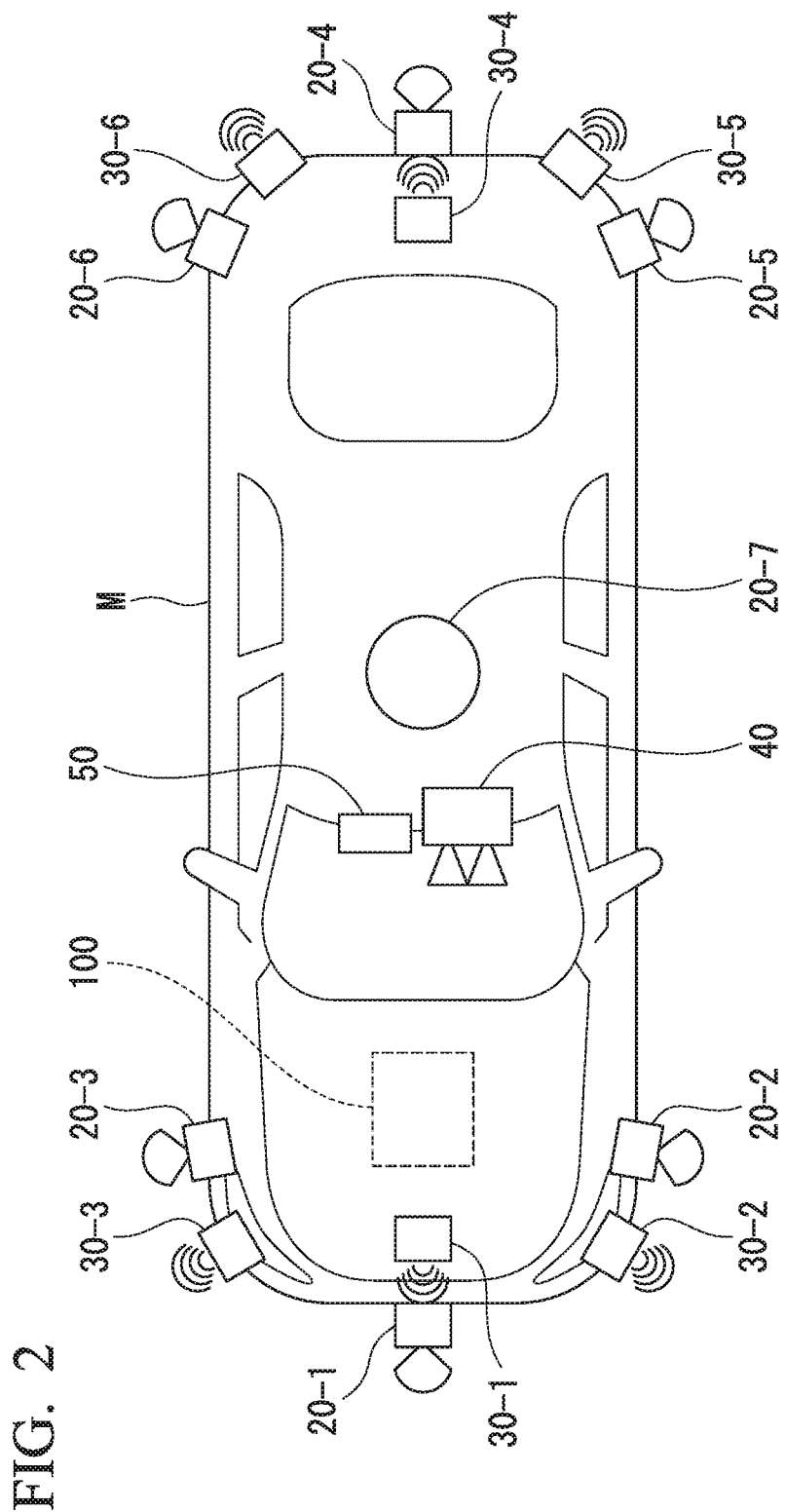
FIG. 2 is a diagram showing an example of a device mounted in a vehicle.

FIG. 2 is a diagram showing an example of a device mounted in the vehicle M. As shown in FIG. 2, in the vehicle M of the present embodiment, devices such as finders 20-1 to 20-7, radars 30-1 to 30-6, a camera 40, the navigation device 50, and the above-described vehicle control device 100 are mounted. For example, the finders 20-1 to 20-7 are light detection and ranging or laser imaging detection and ranging (LIDAR) systems configured to measure scattered light with respect to emitted light and measure the distance to an object. For example, the finder 20-1 is attached to a front grill, a front bumper or the like, and the finders 20-2 and 20-3 are attached to a side surface of a vehicle body with respect to a vehicle traveling direction, a door mirror, the interior of a headlamp, the vicinity of a side lamp, or the like. The finder 20-4 is attached to a trunk lid and the like. The finders 20-5 and 20-6 are attached to a side surface of the vehicle body with respect to the vehicle traveling direction, the interior of a tail lamp, and the like. The above-described finders 20-1 to 20-6 have, for example, a detection range of about 150 degrees with respect to a horizontal direction. In addition, the finder 20-7 is attached to a hood, a roof, or the like. The finder 20-7 has, for example, a detection range of 360 degrees with respect to the horizontal direction.

The above-described radars 30-1 and 30-4 are, for example, long-range millimeter wave radars having a wide detection range in a depth direction (distance direction). In addition, the radars 30-2, 30-3, 30-5, and 30-6 are medium range millimeter wave radars having a narrower detection range in the depth direction (distance direction) and a wider detection range in an azimuth direction (width direction) orthogonal to the depth direction (distance direction) than the radars 30-1 and 30-4. When the finders 20-1 to 20-7 are not particularly distinguished, they will be simply described below as a "finder 20." When the radars 30-1 to 30-6 are not particularly distinguished, they will be simply described below as a "radar 30."

The camera 40 includes, for example, a monocular camera or a stereo camera. The camera 40 is provided, for example, on an upper portion of a front windshield in a boarding space of the vehicle M or a rear surface of a room mirror so that it captures an image in front of the vehicle M. Here, in the camera 40 in the present embodiment, there is no particular limitation on a wavelength of light received during imaging, and, for example, a multispectral camera may be used.

The navigation device 50 includes, for example, a touch panel having a function of receiving a destination setting input from a user and a function of displaying a path to a destination, a navigation satellite device such as a global navigation satellite system (GNSS), an inertial navigation device such as an inertial navigation system (INS), and a storage device. The navigation device 50 combines a radio navigation method using the above-described navigation satellite device and an autonomous navigation method using the inertial navigation device, checks a navigation map (map information) stored in the storage device in advance and a path (road) along which the vehicle M travels, and specifies a position of the vehicle M. The navigation map is a map in which shapes of roads are represented by nodes and links, and information such as the number of lanes and curvatures are added to the links. The navigation device 50 derives a path from the specified position of the vehicle M to a destination set by a user such as the driver or another passenger. Then, the navigation device 50 performs guidance using a voice or a navigation display regarding a path to the destination when at least the vehicle control device 100 executes the manual driving mode. Here, a component for specifying a position of the vehicle M may be provided independently from the navigation device 50.

In addition, the navigation device 50 outputs position information indicating the specified position of the vehicle M, map information used when a destination is set, and path information indicating a path to a destination to the vehicle control device 100. Here, the navigation device 50 may be realized by, for example, a function of a terminal device such as a smartphone or a tablet terminal that the user holds.

Figure 3:
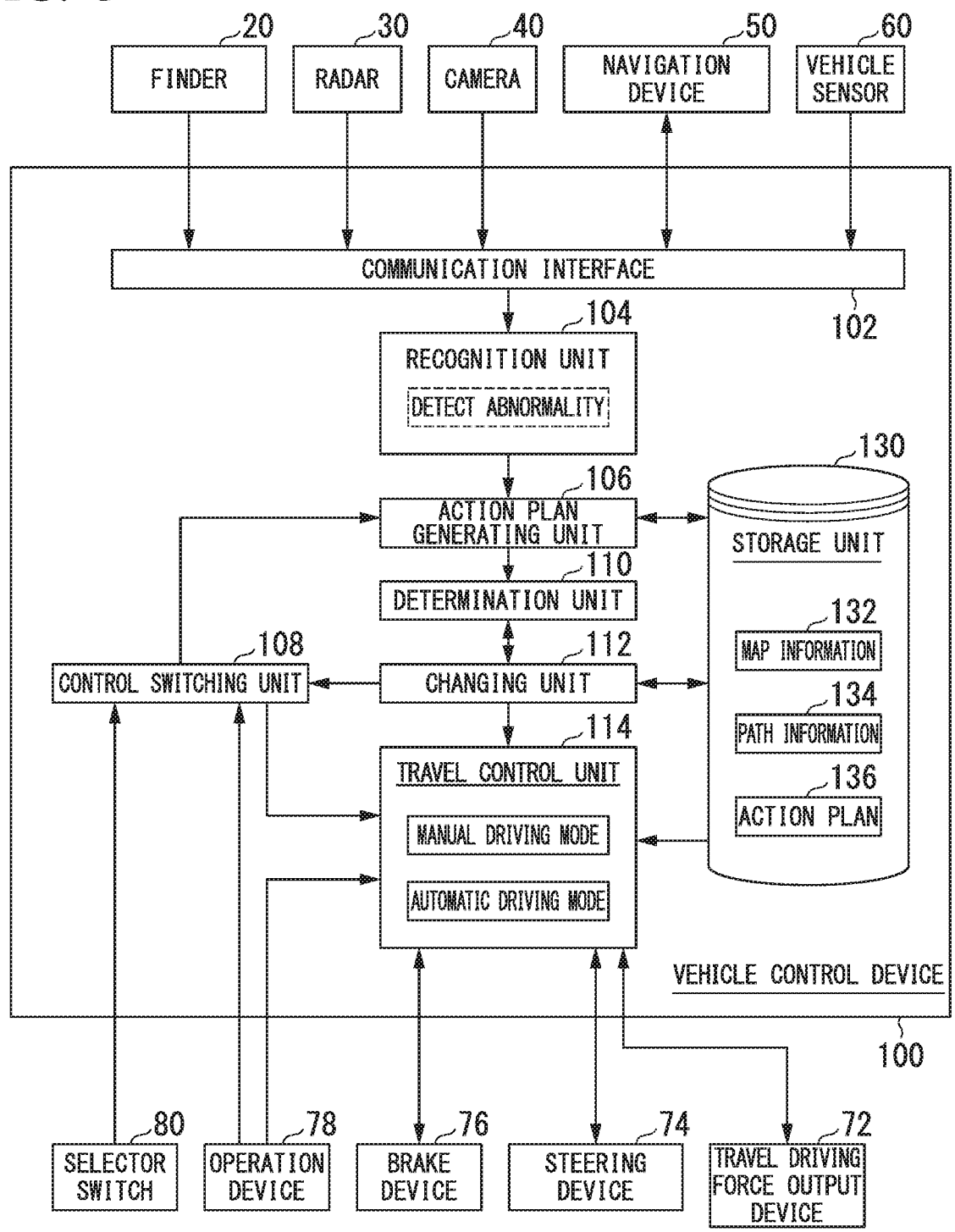
FIG. 3 is a diagram showing an example of a functional configuration of the vehicle in which the vehicle control device according to the present embodiment is mounted.

FIG. 3 is a diagram showing an example of a functional configuration of the vehicle M in which the vehicle control device 100 according to the present embodiment is mounted. In the vehicle M, the finder 20, the radar 30, the camera 40, the navigation device 50, a vehicle sensor 60, a travel driving force output device 72, a steering device 74, a brake device 76, an operation device 78, a selector switch 80, and the vehicle control device 100 are mounted. These devices and components are connected to one another via a multi-plex communication line such as a controller area network (CAN) communication line, a serial communication line, a wireless communication network, or the like.

The vehicle sensor 60 includes a vehicle speed sensor configured to detect a vehicle speed, an acceleration sensor configured to detect an acceleration, a yaw rate sensor configured to detect an angular velocity around a vertical axis, an azimuth sensor configured to detect a direction of the vehicle M, and the like.

For example, when the vehicle M is an automobile using an internal combustion engine as a power source, the travel driving force output device 72 includes an engine and an engine electronic control unit (ECU) configured to control the engine, when the vehicle M is an electric vehicle using an electric motor as a power source, the travel driving force output device 72 includes a traveling motor and a motor ECU configured to control the traveling motor, and when the vehicle M is a hybrid vehicle, the travel driving force output device 72 includes an engine, an engine ECU, a traveling motor, and a motor ECU. When the travel driving force output device 72 includes only an engine, the engine ECU adjusts a throttle opening degree, a shift stage of an engine, and the like according to information input from the travel control unit 114 to be described below, and outputs a travel driving force (torque) with which the vehicle travels. In addition, when the travel driving force output device 72 includes only a traveling motor, the motor ECU adjusts a duty ratio of a PWM signal supplied to the traveling motor according to information input from the travel control unit 114 and outputs the above-described travel driving force. In addition, when the travel driving force output device 72 includes an engine and a traveling motor, both the engine ECU and the motor ECU control a travel driving force in cooperation according to information input from the travel control unit 114.

The steering device 74 includes, for example, an electric motor, a steering torque sensor, and a steering angle sensor. For example, the electric motor applies a force to a rack and pinion function and changes a direction of a steering wheel. For example, the steering torque sensor detects distortion of a torsion bar when the steering wheel is operated as a steering torque (steering force). The steering angle sensor detects, for example, a steering angle (or an actual steering angle). The steering device 74 drives the electric motor according to information input from the travel control unit 114 and changes the direction of the steering wheel.

The brake device 76 includes a master cylinder to which a brake operation applied to a brake pedal is transmitted as a hydraulic pressure, a reservoir tank in which a brake fluid is stored, a brake actuator configured to adjust a braking force output to wheels, and the like. A braking control unit 44 controls the brake actuator and the like so that a brake torque corresponding to a pressure of the master cylinder is output to the wheels according to information input from the travel control unit 114. Here, the brake device 76 is not limited to an electronically controlled brake device that is operated by the hydraulic pressure described above, but may be an electronically controlled brake device that is operated by an electric actuator.

The operation device 78 includes, for example, an accelerator pedal, a brake pedal, a steering wheel, and a shift lever, and operation detection sensors attached thereto. The operation device 78 generates an operation detection signal in response to the operation of the user and outputs the signal to a control switching unit 108 or the travel control unit 114.

The selector switch 80 is a switch that is operated by the driver or the like. For example, the selector switch 80 may be a mechanical switch installed at a steering wheel or a garnish (dashboard) or may be a graphical user interface (GUI) switch provided on a touch panel of the navigation device 50. The selector switch 80 receives an operation performed by the driver or the like, generates a control mode designation signal for designating a control mode of the travel control unit 114 as either the automatic driving mode or the manual driving mode and outputs the signal to the control switching unit 108. As described above, the automatic driving mode is a driving mode in which a vehicle travels while the driver does not perform an operation (or while an operation amount is smaller or an operation frequency is lower than that in the manual driving mode), and more specifically, is a driving mode in which some or all of the travel driving force output device 72, the steering device 74, and the brake device 76 are controlled on the basis of an action plan 136.

The vehicle control device 100 will be described below. The vehicle control device 100 includes, for example, a communication interface 102, a recognition unit 104, an action plan generating unit 106, the control switching unit 108, a determination unit 110, a changing unit 112, the travel control unit 114, and a storage unit 130.

These functional units are connected to one another via an internal bus. The storage unit 130 is realized by, for example, a nonvolatile storage medium such as a read-only memory (ROM), a flash memory, and a hard disk drive (HDD), and a volatile storage medium such as a random-access memory (RAM) and a register. Information stored in the storage unit 130 includes information such as the above-described map information 132, the path information 134, and information indicating the action plan 136 to be described below in addition to a program that a processor executes.

The communication interface 102 is, for example, a hardware interface such as a GP-IB and a USB, and is connected to the various devices described above and the navigation device 50.

The recognition unit 104 acquires detection results of devices via the communication interface 102 and recognizes a state such as a position and a speed of an object such as a peripheral vehicle on the basis of the acquired detection results.

For example, the recognition unit 104 integrates detection results of the finder 20, the radar 30, and the camera 40, and recognizes a state such as a position and a speed of the object (sensor fusion). Further, the recognition unit 104 estimates a movement of the object and the like on the basis of the state such as a position and a speed of the object.

In addition, the recognition unit 104 recognizes a lane in which the vehicle M travels (travel lane) and a relative position of the vehicle M with respect to the travel lane on the basis of the map information 132 stored in the storage unit 130 and information input from the finder 20, the radar 30, the camera 40, the navigation device 50, or the vehicle sensor 60. The map information 132 is, for example, map information with higher accuracy than the navigation map that the navigation device 50 has and includes lane center information, lane boundary information, and the like. More specifically, the map information 132 includes road information, traffic regulation information, address information (address and postal code), facility information, phone number information, and the like. The road information includes information indicating types of roads such as a highway, a toll road, a national road, or a prefectural road, and information about the numbers of lanes on roads, widths of lanes, slopes of roads, positions of roads (3D coordinates including a longitude, a latitude, and a height), curvatures of curves of lanes, positions of lane junctions and branch points, signs provided on roads, and the like. The traffic regulation information includes information about lanes blocked due to construction, traffic accidents, traffic congestion, or the like.

Figure 4:
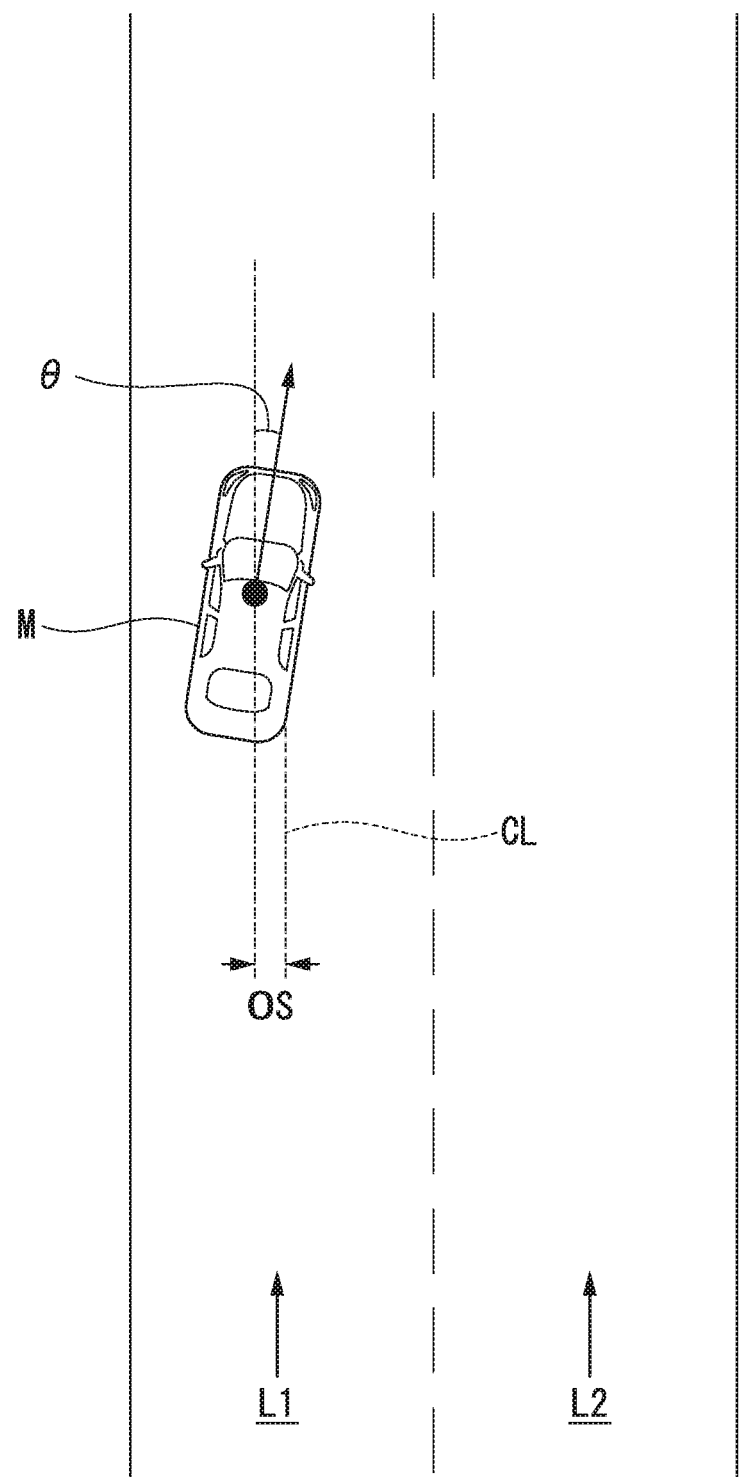
FIG. 4 is a diagram showing a state in which a relative position of a vehicle with respect to a travel lane is recognized by a recognition unit.

FIG. 4 is a diagram showing a state in which a relative position of the vehicle M with respect to a travel lane L1 is recognized by the recognition unit 104. For example, the recognition unit 104 recognizes an angle θ formed by lines connecting a deviation OS from a travel lane center CL at a reference point (for example, the center of gravity) of the vehicle M and the travel lane center CL in the travel direction of the vehicle M as a relative position of the vehicle M with respect to the travel lane L1. Here, when traffic regulation information is included in the map information 132, the recognition unit 104 may correct the recognition result on the basis of the traffic regulation information. For example, when the recognition result shows content in which a vehicle travels in a blocked lane, the recognition unit 104 corrects the content such that a lane in which the vehicle M travels is a lane next to the blocked lane.

In addition, the recognition unit 104 detects an abnormal state of some or all of the finder 20, the radar 30, the camera 40, the navigation device 50, and the vehicle sensor 60. The abnormality detected by the recognition unit 104 includes, for example, a state in which an abnormality occurs in the above-described device itself and a state in which an abnormality occurs in communication with such devices. For example, the recognition unit 104 compares detection results of devices, detects an abnormality of the device, and detects an abnormality of the device on the basis of a history of results detected by the same device. That is, when a position of the object detected by the finder 20 and the radar 30 and a position of the object detected by the camera 40 are significantly different, it is detected that an abnormality has occurred in the camera 40. In addition, the recognition unit 104, for example, monitors a signal (information) transmitted via an internal bus connecting functional units, and detects that an abnormality has occurred in communication. Here, the combination of such an abnormality detection function and a function of the determination unit 110 to be described below corresponds to an "abnormality detection unit."

The action plan generating unit 106 generates the action plan 136 including a plurality of events on the basis of an ambient state recognized by the recognition unit 104 and a state of the vehicle M. FIG. 5 is a diagram showing an example of the action plan 136 generated by the action plan generating unit 106. As shown in FIG. 5, the action plan generating unit 106 decides whether the vehicle M is to travel in the manual driving mode or the automatic driving mode for control sections of the path to the destination included in the path information 134.

For example, when there is a toll road on the path to the destination, the action plan generating unit 106 generates the action plan 136 so that a vehicle travels in a control section including the toll road in the automatic driving mode.

For example, when there is a junction (branch point) on the toll road (for example, a highway), the vehicle control device 100 needs to change lanes or maintain the lane so that the vehicle M advances toward the destination in the automatic driving mode. Accordingly, when it is determined that there is a junction on the path with reference to the map information 132, the action plan generating unit 106 sets a lane change event in which the lane is changed to a desired lane in which the vehicle can advance toward the destination from a current position (coordinates) of the vehicle M to a position (coordinates) of the junction. Here, the action plan generating unit 106 may generate the action plan 136 so that the vehicle M always travels in the automatic driving mode in all control sections of the path to the destination. In the above-described example, the action plan generating unit 106 may set an event in, for example, a control section from a current position of the vehicle M to an entrance toll gate of the toll road and a control section from an exit toll gate of the toll road to the destination as a control section excluding the toll road. For example, when the vehicle M has advanced to within a certain range of the entrance toll gate, the action plan generating unit 106 sets a deceleration event, a lane keep event, and the like, and after the vehicle M leaves the entrance toll gate, the action plan generating unit 106 sets an acceleration event, a lane keep event, and the like. In addition, for example, the action plan generating unit 106 sets a deceleration event when the vehicle M has advanced to the lane junction point, and sets an acceleration event after merging.

In addition, the action plan generating unit 106 changes (updates) the action plan generated while the vehicle M travels on the basis of the ambient state recognized by the recognition unit 104. In general, while the vehicle travels, the ambient state constantly changes. In particular, when the vehicle M travels on a road including a plurality of lanes, distance intervals with other vehicles change relatively. For example, when a vehicle in front brakes suddenly and decelerates and a vehicle that travels in a neighboring lane causes an obstacle in front of the vehicle M, it is necessary for the vehicle M to travel while appropriately changing a speed and a lane according to a movement of a vehicle in front and a movement of a vehicle in an adjacent lane. Therefore, the action plan generating unit 106 updates an event set for each control section according to the change in ambient state described above.

Specifically, when a speed of another vehicle recognized by the recognition unit 104 exceeds a threshold value while the vehicle travels and a movement direction of the other vehicle that travels in a lane adjacent to the vehicle's lane is the same direction, the action plan generating unit 106 changes an event that is set for a control section in which the vehicle M will travel. For example, when events are set so that a lane change event is executed after a lane keep event, if it is determined that the vehicle has advanced at a speed equal to or greater than a threshold value from behind in a lane of a lane change destination during the lane keep event according to the recognition result of the recognition unit 104, the action plan generating unit 106 changes an event following the lane keep event from the lane change to a deceleration event or a lane keep event. Thus, the vehicle control device 100 can avoid collision of the vehicle M with the vehicle in a lane change destination. As a result, even if a change occurs in the ambient state, the vehicle control device 100 can allow the vehicle M to automatically travel safely.

The control switching unit 108 switches the control mode of the vehicle M by the travel control unit 114 from the automatic driving mode to the manual driving mode or from the manual driving mode to the automatic driving mode on the basis of the action plan 136 generated by the action plan generating unit 106. In addition, the control switching unit 108 switches the control mode of the vehicle M by the travel control unit 114 from the automatic driving mode to the manual driving mode or from the manual driving mode to the automatic driving mode on the basis of the control mode designation signal input from the selector switch 80. That is, the control mode of the travel control unit 114 can be arbitrarily changed during travel or during stop according to an operation of the driver or the like.

In addition, the control switching unit 108 switches the control mode of the vehicle M by the travel control unit 114 from the automatic driving mode to the manual driving mode on the basis of the operation detection signal input from the operation device 78. For example, when an operation amount included in the operation detection signal exceeds a threshold value, that is, when the operation device 78 receives an operation with an operation amount that exceeds a threshold value from the driver or the like, the control switching unit 108 switches the control mode of the travel control unit 114 from the automatic driving mode to the manual driving mode. For example, when the vehicle M automatically travels by the travel control unit 114 set in the automatic driving mode, if a steering wheel, an accelerator pedal, or a brake pedal is operated with an operation amount that exceeds a threshold value by the driver, the control switching unit 108 switches the control mode of the travel control unit 114 from the automatic driving mode to the manual driving mode. In response to this, the travel control unit 114 outputs the operation detection signal received from the operation device 78 to the travel driving force output device 72, the steering device 74, and/or the brake device 76. Therefore, according to an operation performed instantly by the driver when a subject such as a human suddenly jumps into the road or a vehicle in front suddenly stops, the vehicle control device 100 can immediately switch the mode to the manual driving mode without operating the selector switch 80. As a result, the vehicle control device 100 can respond to an operation by the driver in the event of an emergency and can improve safety during travel.

Here, the travel control unit 114 will be described first. The travel control unit 114 sets the control mode to the automatic driving mode or the manual driving mode under control of the control switching unit 108 and controls a control target according to the set control mode. In the automatic driving mode, the travel control unit 114 reads the action plan 136 generated by the action plan generating unit 106 and controls a control target on the basis of the event included in the read action plan 136. For example, when the event included in the action plan 136 is a lane change event, the travel control unit 114 refers to a width and the like of the lane included in the map information 132, and decides a control amount (for example, a rotational speed) of an electric motor in the steering device 74 and a control amount (for example, a throttle opening degree and a shift stage of an engine) of an ECU in the travel driving force output device 72. The travel control unit 114 outputs information indicating a control amount decided for each event to a corresponding control target. In the above-described example, the travel control unit 114 outputs information indicating a control amount of an electric motor to the steering device 74 and outputs information indicating a control amount of an ECU to the travel driving force output device 72. Thus, each device to be controlled can control itself according to information indicating a control amount input from the travel control unit 114. In addition, the travel control unit 114 appropriately adjusts the decided control amount on the basis of the detection result of the vehicle sensor 60.

In addition, in the manual driving mode, the travel control unit 114 controls a control target on the basis of the operation detection signal output from the operation device 78. For example, when the operation detection signal indicating an operation amount of the brake pedal is output from the operation device 78, the travel control unit 114 outputs the operation detection signal output from the operation device 78 to the brake device 76 without change. This similarly applies to when an operation detection signal indicating operation amounts of an accelerator pedal, a steering wheel, and a shift lever is output from the operation device 78. Thus, each device to be controlled can control itself according to the operation detection signal output from the operation device 78 through the travel control unit 114.

When an abnormal state is detected by the recognition unit 104, the determination unit 110 determines whether the abnormal state is a specific abnormal state that affects the control result in the automatic driving mode based on the action plan. The specific abnormal state is, for example, a state that affects an event being executed in the travel control unit 114 or an event scheduled following the event being executed. In addition, the specific abnormal state may be a state that affects both an event being executed in the travel control unit 114 and an event scheduled following the event being executed and may be a state that affects the action plan irrespective of the event to be executed in the travel control unit 114.

The determination unit 1I 0 refers to, for example, table data for determining specific abnormal states, and performs the above determination. FIG. 6 is a diagram showing an example of table data used for determining specific abnormal states. In the table data shown in FIG. 6, devices and information necessary for event transition and control of a control target are included. For example, in order to transition to the lane keep event, one or both of the radar 30-1 and the finder 20-1, and the camera 40 are necessary. Thus, when both the radar 30-1 and the finder 20-1 or either the radar 30-1 or the finder 20-1 has an abnormality, the determination unit 110 determines that the abnormal state affects the control result in the automatic driving mode based on the action plan. That is, the determination unit 110 determines that the abnormal state is a specific abnormal state.

In addition, when only one of the radar 30-1 and the finder 20-1 has an abnormality, the determination unit 110 determines that it is possible to cover a detection range of a device (the radar 30-1 or the tinder 20-1) having an abnormality according to a detection range of another device, and determines that the abnormality of the device does not affect the control result in the automatic driving mode based on the action plan. That is, the determination unit 110 determines that the abnormal state is not a specific abnormal state.

In addition, for example, in order to transition to a merging event, the radar 30-1, the finder 20-1, the camera 40, the radars 30-2 and 30-3, and the map information 132 are necessary. Therefore, when at least one of the radar 30-1, the finder 20-1, the camera 40, and the radars 30-2 and 30-3 described above has an abnormality, or when there is an abnormality such as an error with reference to the map information 132 in the action plan generating unit 106, the determination unit 110 determines that the abnormal state affects the control result in the automatic driving mode based on the action plan. That is, the determination unit 110 determines that the abnormal state is a specific abnormal state. Here, the determination unit 110 is not limited to use of the table data when a specific abnormal state is determined but may also determine a specific abnormal state by executing a program in which information equivalent to table data is included. In addition, the determination unit 110 may use map data including information equivalent to the table data.

When it is determined that the abnormal state detected by the recognition unit 104 affects the control result in the automatic driving mode based on the action plan, that is, when it is determined that the abnormal state is a specific abnormal state, the determination unit 110 outputs the determination result to the changing unit 112.

When the determination unit 110 determines that the abnormal state detected by the recognition unit 104 is a specific abnormal state, the changing unit 112 changes content controlled by the travel control unit 114 on the basis of a type of an event being executed according to control by the travel control unit 114 among events included in the action plan. Specifically, when the determination unit 110 determines that the abnormal state detected by the recognition unit 104 is a specific abnormal state, the changing unit 112 changes the action plan generated by the action plan generating unit 106 on the basis of a type of an event being executed in the automatic driving mode by the travel control unit 114. For example, when the event being executed according to control by the travel control unit 114 is a predetermined event, the changing unit 112 causes the travel control unit 114 to continue a predetermined event, prohibits transition to an event scheduled to be executed following the predetermined event, and changes the event scheduled to be executed following the predetermined event to a deceleration event in which the vehicle M stops within a predetermined time T. The predetermined event is, for example, a lane keep event. The predetermined event will be described as a lane keep event below. However, the predetermined event is not limited thereto, and it may be, for example, a lane change event or a branch event.

Figure 7:
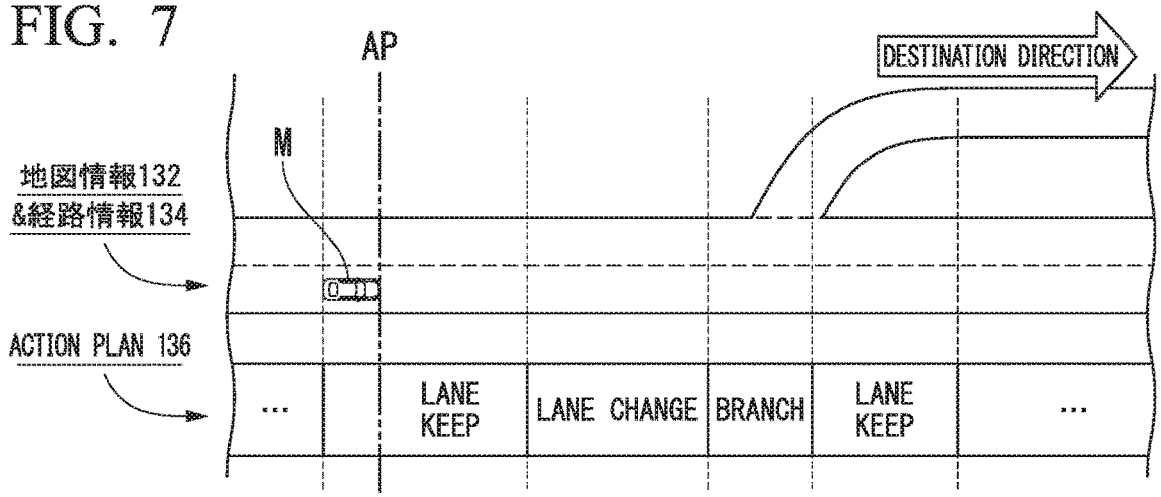
FIG. 7 is a diagram showing a state of a scene in which an event being executed according to control by a travel control unit is a lane keep event.

FIG. 7 is a diagram showing a state of a scene in which an event being executed according to control by the travel control unit 114 is a lane keep event. The dashed line AP shown in FIG. 7 and FIGS. 8 and 9 to be described below indicates a position (time t0) when the determination unit 110 determines that the state is a specific abnormal state. In the example in FIG. 7, during the lane keep event, the determination unit 110 determines that the abnormal state detected by the recognition unit 104 is a specific abnormal state. In this case, the changing unit 112 causes the travel control unit 114 to continue a lane keep event, prohibits transition to an event scheduled to be executed following the lane keep event, that is, lane change, and changes the event scheduled to be executed following the lane keep event to a deceleration event in which the vehicle M stops within the predetermined time T. Thus, when an abnormality that affects the control result during travel is detected, that is, when a specific abnormal state is detected, the vehicle control device 100 can reduce a movement change in the vehicle M. As a result, the vehicle control device 100 can maintain the vehicle M in a stable state.

In addition, when the determination unit 110 determines that the abnormal state detected by the recognition unit 104 is a specific abnormal state, the changing unit 112 changes content controlled by the travel control unit 114 on the basis of a type of an event scheduled to be executed following the event being executed according to control by the travel control unit 114 among events included in the action plan. Specifically, when the travel control unit 114 determines whether a type of an event scheduled to be executed following the event being executed is a predetermined event (a lane keep event in the present embodiment), and the type of the scheduled event is a predetermined event, the changing unit 112 determines whether the predetermined event is capable of executing within the predetermined time T.

Figure 8:
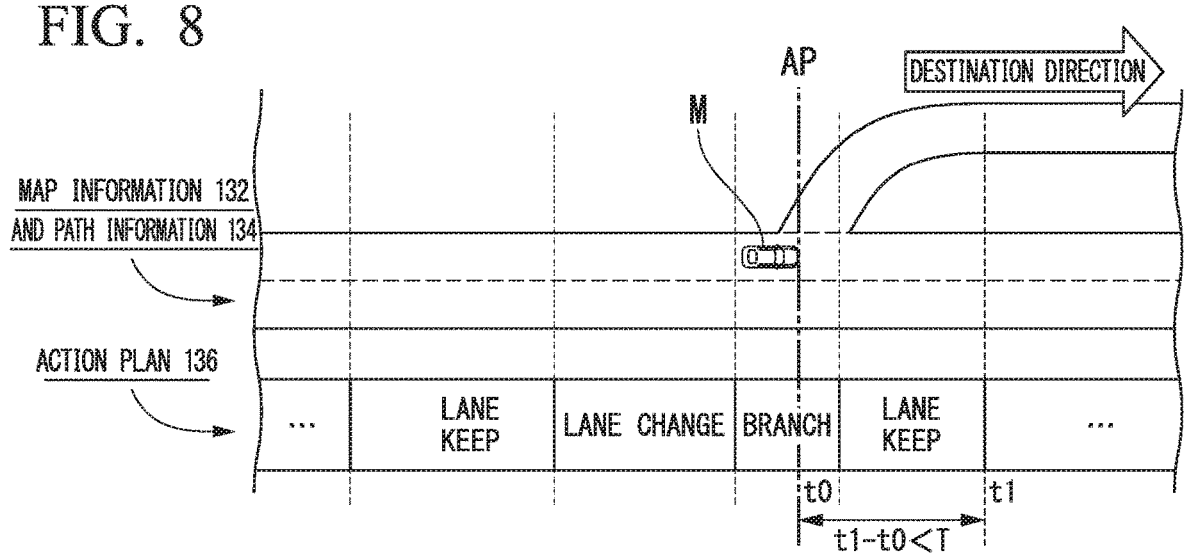
FIG. 8 is a diagram showing a state of a scene in which an event being executed according to control by the travel control unit is a branch event.

FIG. 8 is a diagram showing a state of a scene in which an event being executed according to control by the travel control unit 114 is a branch event. In the example in FIG. 8, during the branch event, the determination unit 110 determines that the abnormal state detected by the recognition unit 104 is a specific abnormal state. In such a case, the changing unit 112 determines whether an event following the branch event is a lane keep event. As shown in FIG. 8, the changing unit 12 determines that the event following the branch event is a lane keep event and determines whether the lane keep event is capable of executing within the predetermined time T. In the example in FIG. 8, the changing unit 112 determines whether the lane keep event is capable of executing within the predetermined time T by comparing a period from a time t0 at which the determination unit 110 determines that a current abnormal state detected by the recognition unit 104 is a specific abnormal state to an end time t1 of a lane keep event scheduled next with the predetermined time T. For example, when the period from the time t0 to the time t1 is shorter than the predetermined time T, the changing unit 112 determines that a lane keep event scheduled to be executed following the branch event that is currently being executed in the travel control unit 114 is capable of executing, and when the period from the time t0 to the time t1 is longer than the predetermined time T, the changing unit 112 determines that a lane keep event scheduled to be executed following the branch event that is currently being executed in the travel control unit 114 is not capable of executing. The above-described predetermined time T is an example of a "predetermined control transition period." In the example in FIG. 8, since the period from the time t0 to the time t1 is shorter than the predetermined time T, the changing unit 112 determines that a lane keep event scheduled to be executed following the branch event being executed in the travel control unit 114 is capable of executing within the predetermined time T.

When it is determined that the lane keep event scheduled to be executed following the event being executed in the travel control unit 114 is capable of executing within the predetermined time T, the changing unit 112 stops a process of changing content controlled by the travel control unit 114 and allows transition to the lane keep event by the travel control unit 114. Accordingly, the travel control unit 114 performs a lane keep event within the predetermined time T. Thus, the vehicle control device 100 can prevent unstable automatic driving from being performed for a long time in an abnormal state. As a result, the vehicle control device 100 can maintain the vehicle M in a stable state.

On the other hand, when it is determined that the lane keep event scheduled to be executed following the event being executed in the travel control unit 114 is not capable of executing within the predetermined time T, the changing unit 112 changes the event scheduled to be executed following the event being executed in the automatic driving mode by the travel control unit 114 to a deceleration event in which the vehicle M stops within the predetermined time T. Thus, when a specific abnormal state that affects control result during travel is detected, the vehicle control device 100 can promptly stop the vehicle M. Here, while the case in which, when it is determined that the lane keep event is not capable of executing within the predetermined time T, the changing unit 112 changes the scheduled event to a deceleration event in which the vehicle M stops within the predetermined time T has been described in the above-described example, the present invention is not limited thereto. For example, the changing unit 112 may change the scheduled event to a deceleration event (slowing event) in which a vehicle is decelerated at a certain speed within the predetermined time T and maintains the decelerated speed. In addition, while the case in which the event changed by the changing unit 112 is an event scheduled immediately after the event that is currently being executed has been described in the above-described example, the present invention is not limited thereto. An event scheduled to be executed second, third or later after the event that is currently being executed may be changed.

In addition, when the type of the event scheduled to be executed following the event being executed by the travel control unit 114 is not a predetermined event (lane keep event), the changing unit 112 determines whether the event scheduled to be executed following the event being executed by the travel control unit 114 can be changed to a predetermined event (lane keep event). Specifically, the changing unit 112 receives the determination result of the determination unit 110, and determines whether an event scheduled to be executed following the event executed in the travel control unit 114 when the determination unit 110 determines that the state is a specific abnormal state is capable of executing in the specific abnormal state.

Figure 9:
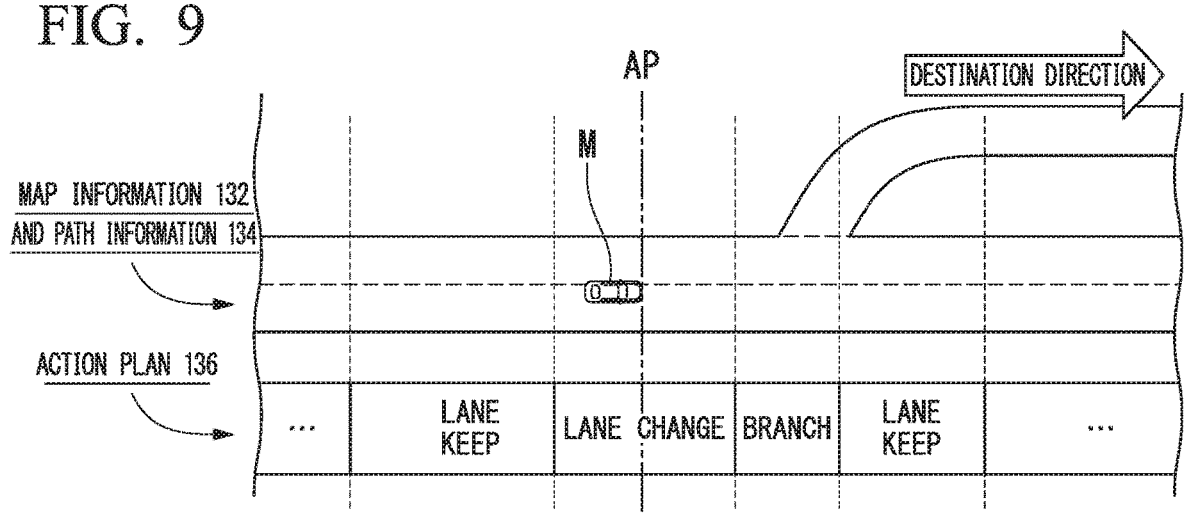
FIG. 9 is a diagram showing a state of a scene in which an event being executed according to control by the travel control unit is a lane change event.

FIG. 9 is a diagram showing a state of a scene in which the event being executed according to control by the travel control unit 114 is a lane change event. In the example in FIG. 9, while the travel control unit 114 executes the lane change event, the determination unit 110 determines that the state is a specific abnormal state.

In addition, an event scheduled to be executed following the lane change event is set as a branch event. In such a case, the changing unit 112 refers to the determination result of the determination unit 110 and determines an abnormal state of devices and an abnormal communication state when the determination unit 110 determines that the state is a specific abnormal state. For example, at a position indicated by the dashed line AP, when there is an abnormality in the radar 30-2 or the radar 30-3, the determination unit 110 refers to the table data in FIG. 6 and determines that the abnormal state of these radars is a specific abnormal state. In this case, when the event executed by the travel control unit 114 is a lane keep event, as shown in the table data in FIG. 6, while the lane keep event is executed by the travel control unit 114, the abnormal state of the radar 30-2 or the radar 30-3 does not affect the control result in the automatic driving mode based on the action plan. That is, even if a specific abnormal state is detected when a certain event is executed by the travel control unit 114, it is not detected as the specific abnormal state when the lane keep event is executed, and does not affect the control result of the travel control unit 114. Accordingly, when the determination unit 110 determines that the state is a specific abnormal state, the changing unit 112 determines whether a lane keep event can be executed according to the specific abnormal state, and when the lane keep event can be executed, changes the scheduled event to a lane keep event, and otherwise, changes the scheduled event to a deceleration event in which the vehicle M stops within the predetermined time T.

When the changing unit 112 changes content controlled by the travel control unit 114 on the basis of the type of the event being executed in the travel control unit 114 or the type of the event scheduled to be executed following the event being executed, the control switching unit 108 is controlled such that the control mode of the travel control unit 114 is switched from the automatic driving mode to the manual driving mode. Thus, the vehicle control device 100 can hand over a control right of the vehicle to the driver when the vehicle M is in a stable state. In addition, when a detection range of a device having an abnormality due to a malfunction or the like can be compensated for by a detection range of another device, it is not determined as a specific abnormal state that affects the control result, and the vehicle control device 100 continues control without changing the initially scheduled action. Therefore, the vehicle control device 100 can reduce the time and effort necessary for the driver to correct a course after the mode transitions to the manual driving mode. As a result, the vehicle control device 100 can improve convenience for a user such as a driver. Here, the changing unit 112 may change content controlled by the travel control unit 114 on the basis of both the type of the event being executed in the travel control unit 114 and the type of the event scheduled to be executed following the event being executed.

Figure 10:
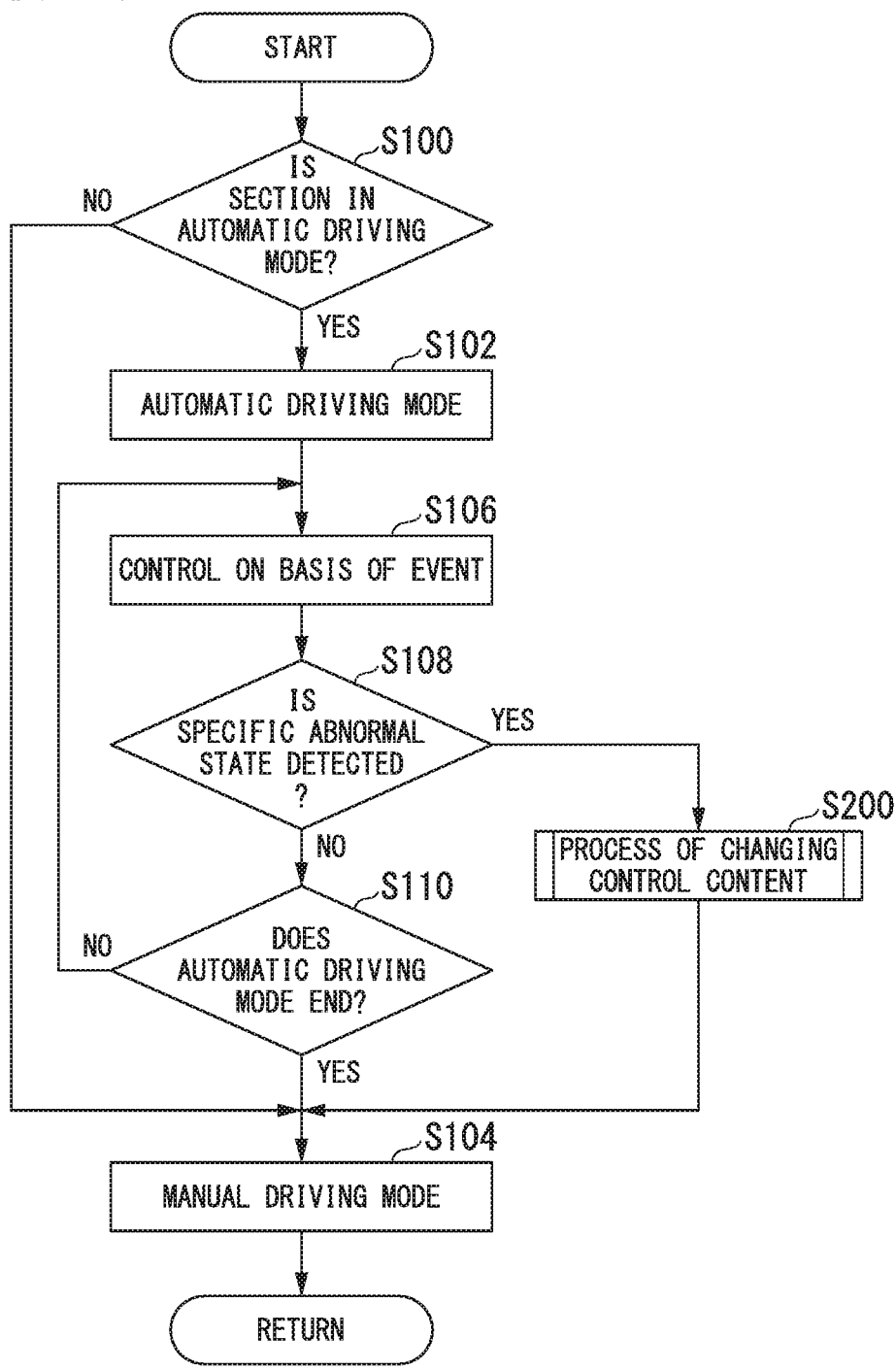
FIG. 10 is a flowchart showing an example of a flow of a process performed by the vehicle control device according to the present embodiment.

FIG. 10 is a flowchart showing an example of a flow of a process performed by the vehicle control device 100 according to the present embodiment. The process of the flowchart is repeatedly performed at predetermined periods when the action plan 136 has already been generated by the action plan generating unit 106. Here, in the process of the flowchart, when the selector switch 80 or the operation device 78 is operated by a user such as a driver in the automatic driving mode, the control switching unit 108 performs a process of switching the control mode of the travel control unit 114 from the automatic driving mode to the manual driving mode in an interruptive manner.

First, the control switching unit 108 determines whether a travel control section of the vehicle M is a travel control section in the automatic driving mode on the basis of the action plan 136 generated by the action plan generating unit 106 (Step S100). When the travel control section is a travel control section in the automatic driving mode, the control switching unit 108 sets the control mode of the travel control unit 114 to the automatic driving mode (Step S102). On the other hand, when the travel control section is not a travel control section in the automatic driving mode, the control switching unit 108 sets the control mode of the travel control unit 114 to the manual driving mode (Step S104), and the process of the flowchart end.

Next, the travel control unit 114 set in the automatic driving mode controls a control target on the basis of the event of the action plan 136 generated by the action plan generating unit 106 (Step S106). Next, the determination unit 110 determines whether the abnormal state detected by the recognition unit 104 is a specific abnormal state (Step S108). When the abnormal state detected by the recognition unit 104 is not a specific abnormal state, that is, when a specific abnormal state is not detected, the vehicle control device 100 determines whether a control section in the automatic driving mode ends with an event that is currently being executed by the travel control unit 114 (Step S110). When the control section in the automatic driving mode ends with an event that is currently being executed by the travel control unit 114, the vehicle control device 100 sets the control mode of the travel control unit 114 to the manual driving mode (Step S104), and the process of the flowchart ends. On the other hand, when the control section in the automatic driving mode does not end with an event that is currently being executed by the travel control unit 114, the process returns to Step S102.

On the other hand, when the abnormal state detected by the recognition unit 104 is a specific abnormal state, that is, when a specific abnormal state is detected, the changing unit 112 changes content controlled by the travel control unit 114 on the basis of either or both of the type of the event being executed according to control by the travel control unit 114 and the type of the event scheduled to be executed following the event being executed among events included in the action plan (Step S200). Next, the control switching unit 108 sets the control mode of the travel control unit 114 to the manual driving mode (Step S104), and the process of the flowchart ends.

Figure 11:
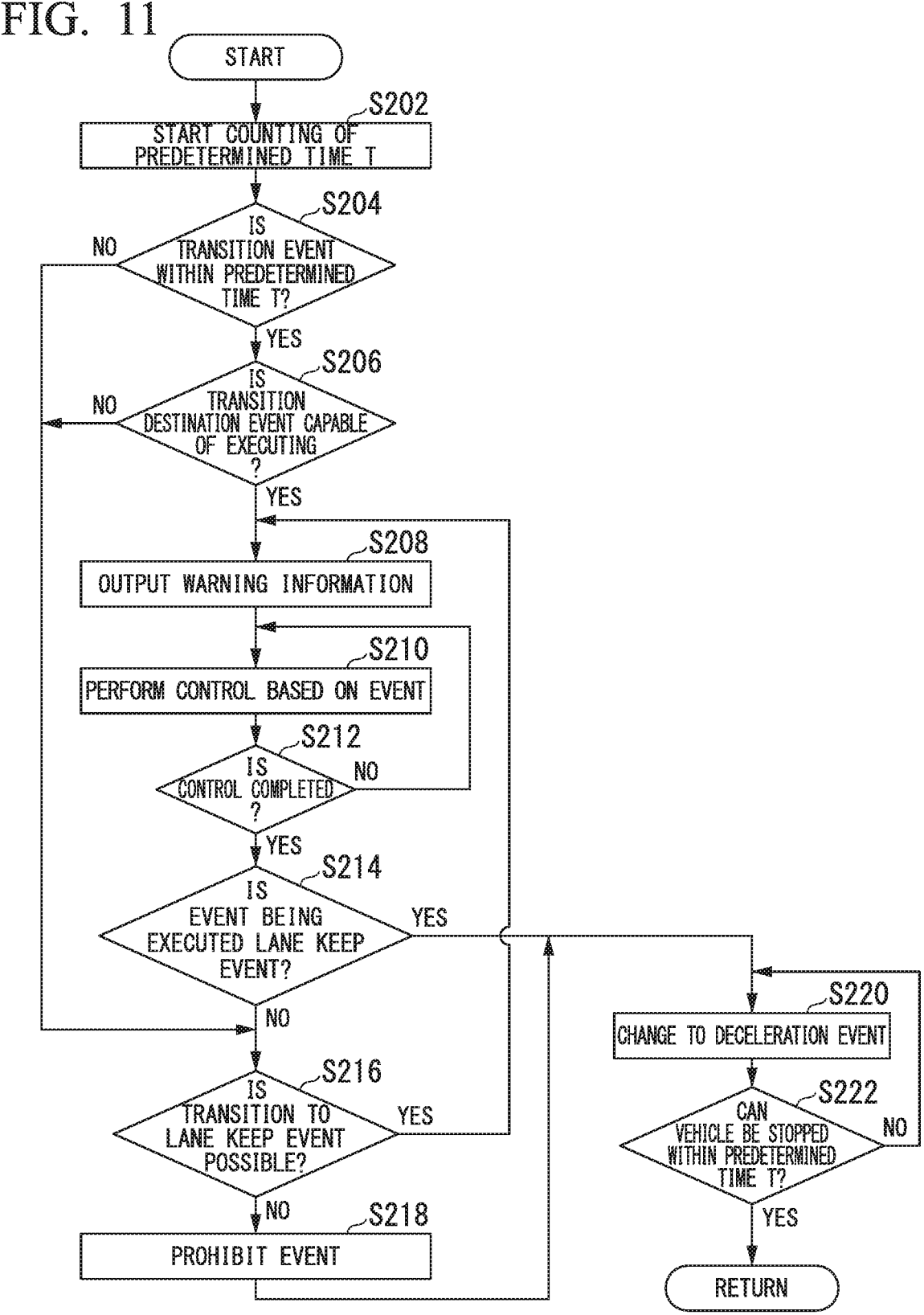
FIG. 11 is a flowchart showing an example of a flow of a process of changing control content executed by a control switching unit and a changing unit in the present embodiment.

FIG. 11 is a flowchart showing an example of a flow of a process of changing control content executed by the control switching unit 108 and the changing unit 112 in the present embodiment. The process of the flowchart corresponds to the process of Step S200 in the flowchart in FIG. 10. First, the changing unit 112 starts counting of the predetermined time T (Step S202). Next, the changing unit 112 determines whether there is a transition destination event within the predetermined time T (Step S204).

The transition destination event represents an event that is scheduled to be executed after the event being executed in the travel control unit 114.

When there is a transition destination event within the predetermined time T, the changing unit 112 determines whether the transition destination event is capable of executing (Step S206). Specifically, the changing unit 112 determines an abnormal state of devices and an abnormal communication state when the determination unit 110 determines that the state is a specific abnormal state, and determines whether the transition destination event is capable of executing according to the specific abnormal state using the table data shown in FIG. 6. Here, the changing unit 112 determines whether the type of the event (transition destination event) scheduled to be executed following the event that is being executed by the travel control unit 114 is a predetermined event (a lane keep event in the present embodiment), and when the type of the scheduled event (transition destination event) is a predetermined event, may determine whether the predetermined event is capable of executing within the predetermined time T. In this case, the changing unit 112 compares, for example, a period from a time t0 (a time at which the process of Step S108 is performed) at which the determination unit 110 determines that the abnormal state detected by the recognition unit 104 is a specific abnormal state to an end time t1 of an event scheduled next (transition destination event) with the predetermined time T, and when the period from the time t0 to the time t1 is shorter than the predetermined time T, determines that the event (transition destination event) scheduled to be executed following the event that is currently being executed in the travel control unit 114 is capable of executing, and when the period from the time t0 to the time t1 is longer than the predetermined time T, determines that the event (transition destination event) scheduled to be executed following the event that is currently being executed in the travel control unit 114 is not capable of executing.

The changing unit 112 outputs warning information indicating that an abnormality has occurred when the transition destination event is capable of executing (Step S208). The warning information is output by, for example, an operation of a pretensioner, an operation of an audio device, or lighting a lighting device up. Next, the changing unit 112 causes the travel control unit 114 to perform control based on the transition destination event (Step S210). Next, the changing unit 112 determines whether control based on the transition destination event is completed (Step S212). Specifically, the changing unit 112 determines whether the current time is an end time of the event, and when the current time is an end time of the event, determines that control based on the transition destination event is completed, and when the current time is not an end time of the event, determines that control based on the transition destination event is not completed.

When control based on the transition destination event is not completed, the process returns to Step S210, and the changing unit 112 causes the travel control unit 114 to continue control based on the transition destination event. On the other hand, when control based on the transition destination event is completed, the changing unit 112 determines whether an event (transition destination event) that is being executed in the travel control unit 114 is a lane keep event (Step S214). When the event (transition destination event) that is being executed in the travel control unit 114 is a lane keep event, the changing unit 112 prohibits transition to an event scheduled to be executed following the event (transition destination event) that is being executed in the travel control unit 114, and changes the event scheduled to be executed next to a deceleration event in which the vehicle M stops within the predetermined time T (Step S220).

On the other hand, when there is no event transitioned within the predetermined time T, when the transition destination event is not capable of executing, or when the event (transition destination event) that is being executed in the travel control unit 114 is not a lane keep event, the changing unit 112 determines an abnormal state of devices and an abnormal communication state when the determination unit 110 determines that the state is a specific abnormal state, and determines whether the event that is currently being executed by the travel control unit 114 can transition to the lane keep event according to the abnormal state of the devices and the abnormal communication state (Step S216). When transition to the lane keep event is possible, the changing unit 112 returns to the process of Step S208 described above. On the other hand, when transition to the lane keep event is not possible, the changing unit 112 prohibits the transition destination event (Step S218), changes an event scheduled to be executed following the event that is being executed in the travel control unit 114 to a deceleration event of stopping the vehicle M within the predetermined time T (Step S220), and causes the travel control unit 114 to perform control based on the deceleration event.

When the vehicle M travels according to control based on the deceleration event in Step S220, the changing unit 112 determines whether the vehicle M can be stopped within the predetermined time T on the basis of the detection result such as an acceleration and a speed detected by the vehicle sensor 60 (Step S222). When the vehicle M cannot be stopped within the predetermined time T, the changing unit 112 returns the process of Step S220 and changes again the event to a deceleration event in which the vehicle M stops within the predetermined time T. That is, the changing unit 112 feeds the detection result of the vehicle sensor 60 back to the control result of the deceleration event, and changes content of the event so that the vehicle M is stopped within the predetermined time T. When the vehicle M can be stopped within the predetermined time T, the changing unit 112 ends the process of the flowchart.

According to the vehicle control device 100, vehicle control method, and vehicle control program of the present embodiment described above, when the travel control unit 114 configured to control travel of the vehicle M on the basis of the action plan including a plurality of events generated by the action plan generating unit 106, the recognition unit 104 configured to detect a specific abnormal state (device abnormality or communication abnormality) that affects the control result of the travel control unit 114, and the changing unit 112 configured to change content controlled by the travel control unit 114 on the basis of either or both of the type of the event being executed according to control by the travel control unit 114 and the type of the event scheduled to be executed following the event being executed among events included in the action plan generated by the action plan generating unit 106 when the specific abnormal state is detected by the recognition unit 104 are included, it is possible to realize control state transition according to the state of the vehicle.

In addition, according to the vehicle control device 100, vehicle control method, and vehicle control program of the present embodiment, when the event being executed in the automatic driving mode by the travel control unit 114 is a lane keep event, the changing unit 112 causes the travel control unit 114 to continue the lane keep event and prohibits transition to an event scheduled to be executed following the lane keep event. Thus, when an abnormality that affects the control result during travel is detected, it is possible to reduce a movement change of the vehicle M according to the vehicle control device 100, the vehicle control method, and the vehicle control program. As a result, according to the vehicle control device 100, the vehicle control method, and the vehicle control program, it is possible to maintain the vehicle M in a stable state.

In addition, according to the vehicle control device 100, vehicle control method, and vehicle control program of the present embodiment, when there is an abnormality in a device necessary for the lane keep event and it is not possible to cover a detection range of the abnormal device using other normal devices, the changing unit 112 changes the event scheduled to be executed following the event being executed to a deceleration event in which the vehicle stops within the predetermined time T. Thus, when an abnormality that affects the control result during travel is detected, according to the vehicle control device 100, the vehicle control method, and the vehicle control program, it is possible to promptly stop the vehicle M while the vehicle M is in a stable state. As a result, according to the vehicle control device 100, the vehicle control method, and the vehicle control program, it is possible to maintain the vehicle M in a more stable state.

In addition, according to the vehicle control device 100, vehicle control method, and vehicle control program of the present embodiment, when content controlled by the travel control unit 114 is changed on the basis of the type of the event that is being executed in the travel control unit 114 or the type of the event scheduled to be executed following the event being executed, the control switching unit 108 is controlled such that the control mode of the travel control unit 114 is switched from the automatic driving mode to the manual driving mode. Therefore, it is possible to smoothly hand over the control right of the vehicle to the driver.

In addition, according to the vehicle control device 100, vehicle control method, and vehicle control program of the present embodiment, when a detection range of a device having an abnormality due to a malfunction or the like can be compensated for by a detection range of another device, it is not determined as an abnormality that affects the control result of the travel control unit 114, and the initially scheduled action continues without change. Therefore, it is possible to reduce the time and effort necessary for the driver to correct a course after the mode transitions to the manual driving mode. As a result, according to the vehicle control device 100, vehicle control method, and vehicle control program of the present embodiment, it is possible to improve convenience for a user such as a driver.

In addition, according to the vehicle control device 100, vehicle control method, and vehicle control program of the present embodiment, the changing unit 112 determines whether the event scheduled to be executed following the event being executed by the travel control unit 114 is capable of executing within the predetermined time T, and when it is determined that the event scheduled to be executed following the event being executed by the travel control unit 114 is capable of executing within the predetermined time T, stops a process of changing control content performed by the travel control unit 114, and allows transition to the scheduled event by the travel control unit 114. Thus, according to the vehicle control device 100, the vehicle control method, and the vehicle control program, it is possible to perform control on the basis of the result obtained by appropriately determining a continuation possibility of control based on the action plan by the travel control unit 114.

Figure 12:
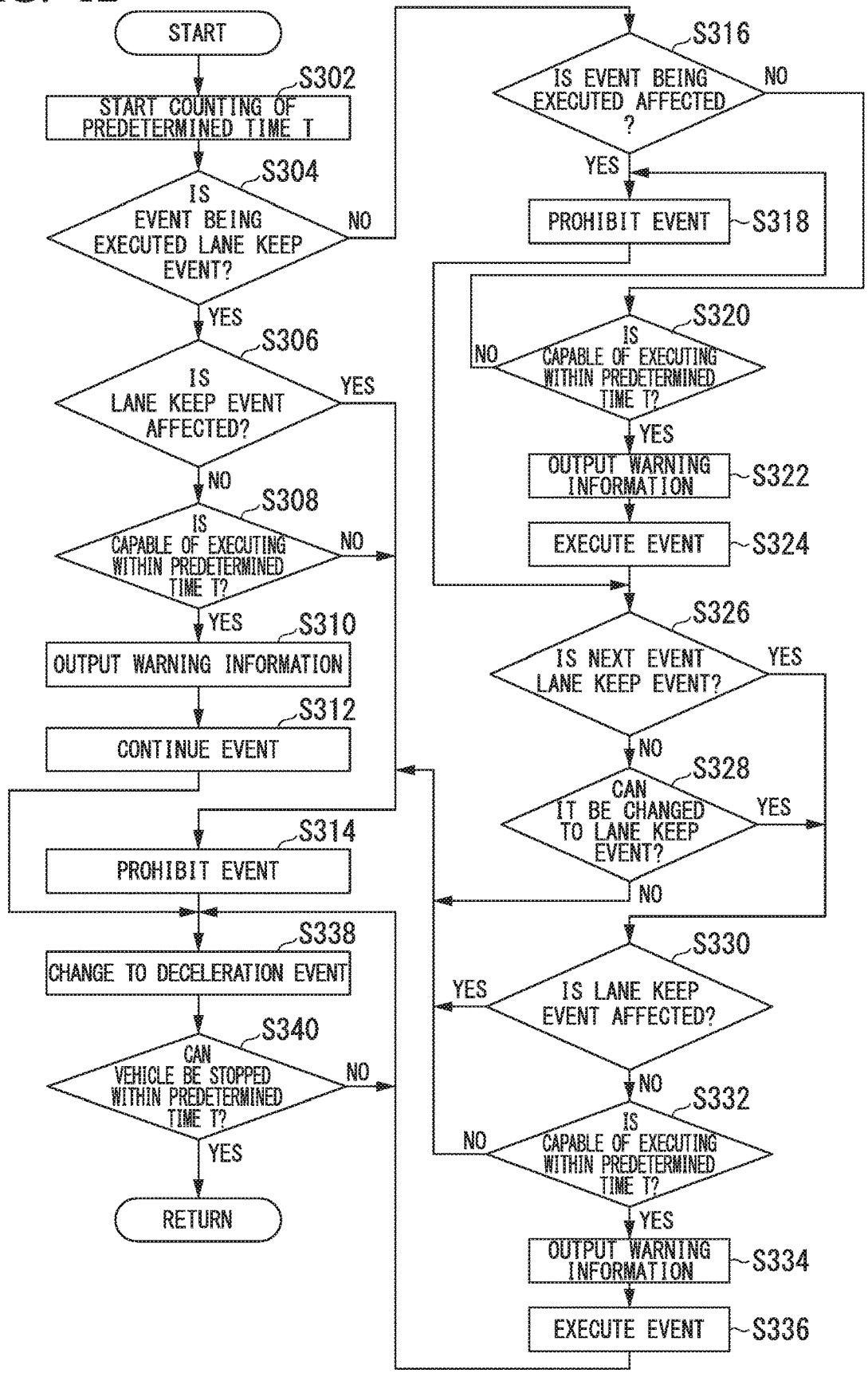
FIG. 12 is a flowchart showing another example of a flow of a process of changing control content executed by the control switching unit and the changing unit in the present embodiment.

Other embodiments will be described below. For example, the vehicle control device 100 in the above-described embodiment may perform the process according to a flowchart shown in FIG. 12 in place of the flowchart shown in FIG. 11. FIG. 12 is a flowchart showing another example of a flow of a process of changing control content executed by the control switching unit 108 and the changing unit 112 in the present embodiment. The process of the flowchart corresponds to the process of Step S200 in the flowchart of FIG. 10.

First, the changing unit 112 starts counting of the predetermined time T (Step S302). Next, the changing unit 112 determines whether the event being executed is a lane keep event (Step S304). When the event being executed is a lane keep event, the changing unit 112 determines an abnormal state of devices and an abnormal communication state when the determination unit 110 determines that the state is a specific abnormal state, and determines whether the lane keep event being executed is affected (Step S306). When the lane keep event being executed is not affected, the changing unit 112 determines whether the lane keep event being executed is capable of executing within the predetermined time T (Step S308). When the lane keep event being executed is capable of executing within the predetermined time T, the changing unit 112 outputs warning information (Step S310), stops a process of changing the lane keep event being executed, and causes the travel control unit 114 to continue control based on the lane keep event being executed (Step S312). On the other hand, when the lane keep event being executed is affected or when the lane keep event being executed is not capable of executing within the predetermined time T, the changing unit 112 prohibits the lane keep event being executed (Step S314).

On the other hand, when the event being executed is not a lane keep event, the changing unit 112 determines an abnormal state of devices and an abnormal communication state when the determination unit 110 determines that the state is a specific abnormal state, and determines whether another event being executed that is not the lane keep event is affected (Step S316). When the other event being executed is not affected, the changing unit 112 determines whether the other event being executed is capable of executing within the predetermined time T (Step S320). When the other event being executed is capable of executing within the predetermined time T, the changing unit 112 outputs warning information (Step S322), stops a process of changing the other event being executed, and causes the travel control unit 114 to continue control based on the other event being executed (Step S324). When the other event being executed is affected or when the other event being executed is not capable of executing within the predetermined time T, the changing unit 112 prohibits the other event being executed (Step S318).

Next, the changing unit 112 determines whether a scheduled event (transition destination event) to be executed following the other event being executed is a lane keep event (Step S326). When a scheduled event (transition destination event) to be executed following the other event being executed is not a lane keep event, the changing unit 112 determines whether the scheduled event (transition destination event) can be changed to a lane keep event (Step S328). Specifically, the changing unit 112 determines an abnormal state of devices and an abnormal communication state when the determination unit 110 determines that the state is a specific abnormal state, and determines whether a lane keep event is affected. When the lane keep event is not affected, the changing unit 112 determines that the scheduled event can be changed to the lane keep event, and when the lane keep event is affected, the changing unit 112 determines that the scheduled event (transition destination event) cannot be changed to the lane keep event.

When the scheduled event (transition destination event) cannot be changed to the lane keep event, the changing unit 112 prohibits the scheduled event (transition destination event) (Step S314). On the other hand, when the scheduled event (transition destination event) to be executed following the other event being executed is the lane keep event, or when the scheduled event (transition destination event) can be changed to the lane keep event, the changing unit 112 determines an abnormal state of devices and an abnormal communication state when the determination unit 110 determines that the state is a specific abnormal state, and determines whether the scheduled event (transition destination event) which is a lane keep event is affected (Step S330).

When the scheduled event (transition destination event) which is a lane keep event is affected, the changing unit 112 prohibits the scheduled event (transition destination event) (Step S314). When the scheduled event (transition destination event) which is a lane keep event is not affected, the changing unit 112 determines whether the scheduled event (transition destination event) is capable of executing within the predetermined time T (Step S332). When the scheduled event (transition destination event) is not capable of executing within the predetermined time T, the changing unit 112 prohibits the scheduled event (transition destination event) (Step S314). On the other hand, when the scheduled event (transition destination event) is capable of executing within the predetermined time T, the changing unit 112 outputs warning information (Step S324), stops a process of changing the scheduled event (transition destination event), and causes the travel control unit 114 to continue control based on the scheduled event (transition destination event) (Step S326). That is, the changing unit 112 causes the travel control unit 114 to perform control based on the lane keep event scheduled. Here, when it is determined as positive in the determination of Step S328, the changing unit 112 may skip the process of Step S330 and perform the process of Step S332.

Next, the changing unit 112 changes the event scheduled to be executed following the event that is being executed in the travel control unit 114 to a deceleration event in which the vehicle M stops within the predetermined time T (Step S338) and causes the travel control unit 114 to perform control based on the deceleration event.

When the vehicle M travels according to control based on the deceleration event in Step S338, the changing unit 112 determines whether the vehicle M can be stopped within the predetermined time T on the basis of the detection result such as an acceleration and a speed detected by the vehicle sensor 60 (Step S340). When the vehicle M cannot be stopped within the predetermined time T, the changing unit 112 returns the process of Step S338 and changes again the event to a deceleration event in which the vehicle M stops within the predetermined time T. That is, the changing unit 112 feeds the detection result of the vehicle sensor 60 back to the control result of the deceleration event, and changes content of the event so that the vehicle M is stopped within the predetermined time T. When the vehicle M can be stopped within the predetermined time T, the changing unit 112 ends the process of the flowchart.

Even if the process of the flowchart in FIG. 12 described above is performed, it is possible to realize control state transition according to the state of the vehicle as in the process of the flowchart in FIG. 11.

While forms for implementing the present invention have been described above with reference to embodiments, the present invention is not limited to the embodiments at all, and various modifications and substitutions can be made without departing from the spirit and scope of the present invention.

REFERENCE SIGNS LIST

20 Finder
30 Radar
40 Camera
50 Navigation device
60 Vehicle sensor
72 Travel driving force output device
74 Steering device
76 Brake device
78 Operation device
80 Selector switch
100 Vehicle control device
102 Communication interface
104 Recognition unit
106 Action plan generating unit
108 Control switching unit
110 Determination unit
112 Changing unit
114 Travel control unit
130 Storage unit
M Vehicle

What is claim is:

1. A vehicle control device comprising:
a travel control unit configured to control travel of a vehicle on the basis of an action plan including a plurality of events that are sequentially executed to control acceleration and deceleration or steering when the vehicle travels, the plurality of events consisting of
a deceleration event in which the vehicle decelerates,
a lane keep event in which the vehicle travels without deviating from a travel lane,
a lane change event in which the vehicle changes the travel lane, an overtaking event in which the vehicle overtakes a forward vehicle,
a branch event in which the vehicle changes to a desired lane at a branch point and travels without deviating from the changed lane, and
a merging event in which the vehicle accelerates and decelerates at a lane junction point and changes the travel lane;
an automatic driving mode in which at least travel control is performed by the travel control unit, the action plan in the automatic driving mode consisting of the plurality of events set for control sections;
an abnormality detection unit configured to detect a specific abnormal state that affects a control result of the travel control unit based on the action plan; and
a changing unit configured to change an event executed according to control by the travel control unit on the basis of a type of an event scheduled to be executed following the event being executed according to control by the travel control unit among events included in the action plan when the specific abnormal state is detected by the abnormality detection unit and the vehicle is in the automatic driving mode.

2. The vehicle control device according to claim 1, further comprising
an action plan generating unit configured to generate the action plan on the basis of path information indicating a path to a destination set by a user,
wherein the travel control unit controls travel of the vehicle on the basis of the action plan generated by the action plan generating unit.

3. The vehicle control device according to claim 1,
wherein the changing unit prohibits control based on the action plan by the travel control unit on the basis of a type of an event scheduled to be executed following the event being executed according to control by the travel control unit among events included in the action plan when the specific abnormal state is detected by the abnormality detection unit.

4. The vehicle control device according to claim 1,
wherein, when the specific abnormal state is detected by the abnormality detection unit, if the event being executed according to control by the travel control unit is a lane keep event in which the vehicle travels without deviating from a travel lane, the changing unit causes the travel control unit to continue the lane keep event and prohibits transition to an event scheduled to be executed following the lane keep event.

5. The vehicle control device according to claim 1, further comprising
a control switching unit configured to perform a process of switching from an automatic driving mode in which travel control is performed by the travel control unit to a manual driving mode in which travel control is performed by an operation of a driver,
wherein, when the specific abnormal state is detected by the abnormality detection unit, the changing unit causes the travel control unit to execute control for starting a process of switching from the automatic driving mode to the manual driving mode in the control switching unit so that the switching process is completed within a predetermined control transition period.

6. The vehicle control device according to claim 5,
wherein the predetermined control transition period is a period from when the control switching unit starts a process of switching the mode to the manual driving mode until a predetermined time elapses.

7. The vehicle control device according to claim 5,
wherein the abnormality detection unit detects the specific abnormal state on the basis of a detection result for each of a plurality of devices configured to detect an object near the vehicle.

8. The vehicle control device according to claim 5,
wherein the changing unit determines whether the event scheduled to be executed following the event being executed by the travel control unit is capable of executing within the predetermined control transition period on the basis of the detection result of the abnormality detection unit, and
when it is determined that the event scheduled to be executed following the event being executed by the travel control unit is capable of executing within the predetermined control transition period, stops a process of changing the event executed according to control by the travel control unit and allows transition to the scheduled event by the travel control unit.

9. The vehicle control device according to claim 8,
wherein the changing unit determines whether the travel control unit is capable of executing the lane keep event when it is determined that the event scheduled to be executed following the event being executed by the travel control unit is not capable of executing within the predetermined control transition period, and
causes the travel control unit to execute control for stopping the vehicle within the predetermined control transition period when it is determined that the travel control unit is not capable of executing the lane keep event within the predetermined control transition period.

10. The vehicle control device according to claim 8, further comprising
a determination unit configured to, when the abnormality detection unit detects that the specific abnormal state is an abnormality related to the device, determine whether it is possible to cover a detection range of the device having an abnormality by a detection range of a device different from the device having an abnormality,
wherein the changing unit causes the travel control unit to execute control for stopping the vehicle within the predetermined control transition period when the determination unit determines that it is not possible to cover a detection range of the device having an abnormality by a detection range of a device different from the device having an abnormality.

11. A vehicle control method comprising:
controlling travel of a vehicle on the basis of an action plan including a plurality of events that are sequentially executed to control acceleration and deceleration or steering when the vehicle travels, the plurality of events consisting of a deceleration event in which the vehicle decelerates, a lane keep event in which the vehicle travels without deviating from a travel lane, a lane change event in which the vehicle changes the travel lane, an overtaking event in which the vehicle overtakes a forward vehicle, a branch event in which the vehicle changes to a desired lane at a branch point and travels without deviating from the changed lane, and a merging event in which the vehicle accelerates and decelerates at a lane junction point and changes the travel lane;

detecting a specific abnormal state that affects a control result of travel of the vehicle based on the action plan; and changing an event on the basis of a type of the event scheduled to be executed following the event being executed according to control by the travel control unit among events included in the action plan when the specific abnormal state is detected.

12. A vehicle control program causing a computer to execute:

controlling travel of a vehicle on the basis of an action plan including a plurality of events that are sequentially executed to control acceleration and deceleration or steering when the vehicle travels, the plurality of events consisting of a deceleration event in which the vehicle decelerates, a lane keep event in which the vehicle travels without deviating from a travel lane, a lane change event in which the vehicle changes the travel lane, an overtaking event in which the vehicle overtakes a forward vehicle, a branch event in which the vehicle changes to a desired lane at a branch point and travels without deviating from the changed lane, and a merging event in which the vehicle accelerates and decelerates at a lane junction point and changes the travel lane;

detecting a specific abnormal state that affects a control result of travel of the vehicle based on the action plan; and changing an event on the basis of a type of the event scheduled to be executed following the event being executed according to control by the travel control unit among events included in the action plan when the specific abnormal state is detected.

13. The vehicle control device according to claim 1, further comprising a control switching unit configured to perform a process of switching from an automatic driving mode in which travel control is performed by the travel control unit to a manual driving mode in which travel control is performed by an operation of a driver, wherein when the event scheduled to be executed following the event being executed is the lane keep event, the control switching unit performs the process of switching from the automatic driving mode to the manual driving mode after the vehicle has been stopped by executing the deceleration event after the lane keep event has been executed, and when the event scheduled to be executed to following the event being executed is not the lane keep event, the changing unit changes the event scheduled to be executed following the event being executed to the lane keep, event and the control switching unit performs the process of switching from the automatic driving mode to the manual driving mode after the vehicle has been stopped by executing the deceleration event after the lane keep event has been executed.

* * * * *